(12) United States Patent
Di Leo et al.

(10) Patent No.: US 11,459,094 B2
(45) Date of Patent: Oct. 4, 2022

(54) CABLE-DRIVEN FOUR-BAR LINK LEG MECHANISM

(71) Applicant: Georgia Tech Research Corporation, Atlanta, GA (US)

(72) Inventors: Claudio V. Di Leo, Atlanta, GA (US); Mark F. Costello, Atlanta, GA (US); Benjamin Leon, Atlanta, GA (US); Julian Jose Rimoli, Atlanta, GA (US); Michael B. Ward, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 302 days.

(21) Appl. No.: 16/645,370

(22) PCT Filed: Sep. 28, 2018

(86) PCT No.: PCT/US2018/053385
§ 371 (c)(1),
(2) Date: Mar. 6, 2020

(87) PCT Pub. No.: WO2019/067873
PCT Pub. Date: Apr. 4, 2019

(65) Prior Publication Data
US 2020/0298964 A1    Sep. 24, 2020

Related U.S. Application Data

(60) Provisional application No. 62/565,461, filed on Sep. 29, 2017.

(51) Int. Cl.
*B64C 25/20* (2006.01)
*B64C 25/00* (2006.01)
(Continued)

(52) U.S. Cl.
CPC ............ *B64C 25/20* (2013.01); *B64C 25/001* (2013.01); *B64C 25/12* (2013.01); *B64C 25/62* (2013.01);
(Continued)

(58) Field of Classification Search
CPC ....... B64C 25/001; B64C 25/52; B64C 25/62; B64C 2025/008; B64C 2025/325
See application file for complete search history.

(56) References Cited

U.S. PATENT DOCUMENTS 3,173,632 A * 3/1965 Woods .................... B64C 25/52
244/108
4,142,698 A * 3/1979 Niebanck ................ B64C 25/00
244/104 R
(Continued)

FOREIGN PATENT DOCUMENTS

WO    WO-2018090810 A1 *  5/2018 ............. B64C 25/10

*Primary Examiner* — Tye William Abell
(74) *Attorney, Agent, or Firm* — Bryan W. Bockhop; Bockhop Intellectual Property Law, LLC

(57) ABSTRACT

A leg mechanism includes an articulated leg system (100), a passive device (130) and a cable (134). The articulated leg system (100) has a leg portion (128). The passive device (130) is coupled to the articulated leg system and is configured to apply a first force to a portion thereof. The cable (134) is coupled to the articulated leg system (100) and is configured to apply a second force, in opposition to the first force, to a portion thereof. When the cable (134) is drawn away from the articulated leg system (100), the second force moves the leg portion (128) in a first direction. When tension is released from the cable (134), the passive device (130) exerts the first force so as to move the leg portion (128) a second direction that is opposite the first direction.

18 Claims, 3 Drawing Sheets

(51) Int. Cl.
 *B64C 25/12* (2006.01)
 *B64C 25/62* (2006.01)
 *B64C 25/32* (2006.01)

(52) U.S. Cl.
 CPC .. *B64C 2025/008* (2013.01); *B64C 2025/125* (2013.01); *B64C 2025/325* (2013.01)

(56) References Cited

U.S. PATENT DOCUMENTS

| | | | | |
|---|---|---|---|---|
| 5,562,051 | A * | 10/1996 | Rizzi | A47B 3/0911 248/439 |
| 9,085,361 | B2 * | 7/2015 | Prud'Homme-Lacroix | B64C 25/52 |
| 2011/0049293 | A1 * | 3/2011 | Koletzko | B64C 25/52 244/102 A |
| 2013/0181091 | A1 * | 7/2013 | Evans | F16H 25/14 244/102 A |
| 2014/0190371 | A1 * | 7/2014 | Woog | A61G 13/105 108/36 |
| 2018/0194458 | A1 * | 7/2018 | Ni | B64C 25/24 |

* cited by examiner

CABLE-DRIVEN FOUR-BAR LINK LEG MECHANISM

CROSS-REFERENCE TO RELATED APPLICATION(S)

This application claims the benefit of U.S. Provisional Patent Application Ser. No. 62/565,461, filed Sep. 29, 2017, the entirety of which is hereby incorporated herein by reference.

STATEMENT OF GOVERNMENT INTEREST

This invention was made with government support under agreement No. FA8650-2-C-7276, awarded by the Department of the Air Force. The government has certain rights in the invention.

BACKGROUND OF THE INVENTION

1. Field of the Invention

The present invention relates to leg mechanisms and, more specifically, to a leg mechanism with adjustable extension.

2. Description of the Related Art

Vertical takeoff and landing (VTOL) aircraft, such as helicopters, access landscapes that fixed-wing aircraft are unable to reach. Such aircraft play a critical role in applications such as the military, emergency air medical services, remote location access and the like.

However, even with VTOL capabilities, VTOL aircraft have landing limitations due to ground slope and surface obstacles. Because typical VTOL aircraft have landing gear (including landing skids and landing wheels) in which both sides of the gear extend at an equal distance below the aircraft, an uneven landing surface at a location can prevent an aircraft from landing at the location.

A similar problem is experienced in robotic applications. While robots that are configured to walk can walk along even surfaces, only more advanced robots can walk on uneven surfaces. Such robots typically control each leg separately and require complex calculations for each step in order to navigate an uneven surface.

Therefore, there is a need for a leg system that is adapted for use with uneven surfaces.

SUMMARY OF THE INVENTION

The disadvantages of the prior art are overcome by the present invention which, in one aspect, is a leg mechanism that includes an articulated leg system, a passive device and a cable. The articulated leg system has a leg portion. The passive device is coupled to the articulated leg system and is configured to apply a first force to a portion thereof. The cable is coupled to the articulated leg system and is configured to apply a second force, in opposition to the first force, to a portion thereof. When the cable is drawn away from the articulated leg system, the second force moves the leg portion in a first direction. When tension is released from the cable, the passive device exerts the first force so as to move the leg portion a second direction that is opposite the first direction.

In another aspect, the invention is a two leg system that includes a first leg mechanism, a second leg mechanism and an actuator. The first leg mechanism includes a first upright bar that moves vertically in response to an amount of tension applied a first cable. The second leg mechanism, which is reflectively disposed oppositely from the first leg mechanism, includes a first upright bar that moves vertically in response to an amount of tension applied a first cable. An actuator applies tension to both the first cable and the second cable.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1A:
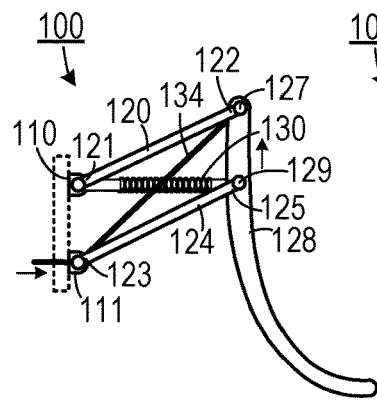
FIG. 1A is a schematic diagram of a first representative embodiment of a leg system in which the leg is retracted.

A preferred embodiment of the invention is now described in detail. Referring to the drawings, like numbers indicate like parts throughout the views. Unless otherwise specifically indicated in the disclosure that follows, the drawings are not necessarily drawn to scale. The present disclosure should in no way be limited to the exemplary implementations and techniques illustrated in the drawings and described below. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Also, as used herein a "cable" can include any type of elongated substantially inelastic (when under tension) yet flexible device and can include, for example, a steel cable, a rope, a wire, a cord, a line, a strap, etc., depending upon the specific application. Also, as used herein, "spring" means any compressive elastic device and can include such devices as a coil spring, a torsion spring, a gas (pneumatic) spring, etc.

Figure 1B:
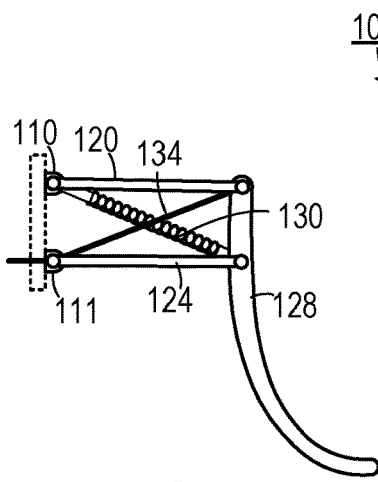
FIG. 1B is a schematic diagram of the leg system shown in FIG. 1A in which the leg is moderately extended.
Figure 1C:
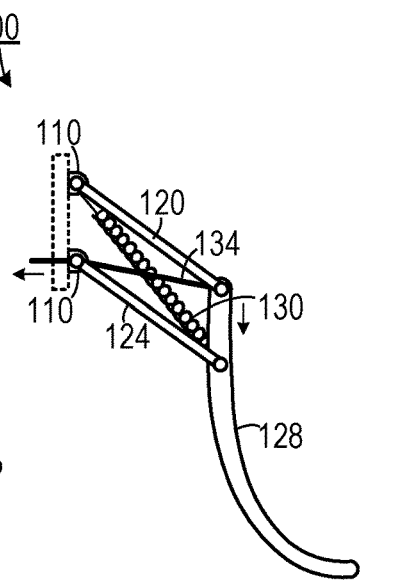
FIG. 1C is a schematic diagram of the leg system shown in FIG. 1A in which the leg is fully extended.

As shown in FIGS. 1A-1C, one embodiment of an articulated leg system 100 includes a first platform coupling joint 110 and a second platform coupling joint 111. A first lateral bar 120 has a proximal end 121 that is rotationally coupled to the first platform coupling joint 110 so that the first lateral bar 120 is rotatable about the first platform coupling joint 110 and is constrained to movement along a predetermined plane (i.e., it has one degree of freedom). A second lateral bar 124 is disposed below the first lateral bar 120 and has a proximal end 123 that is rotationally coupled to the second platform coupling joint 111 so that the second lateral bar 124 is rotatable about the second platform coupling joint 111 and is constrained to movement along the predetermined plane. An upright bar 128, which acts as a leg portion, has a first bar coupling joint 127 to which the distal end 122 of the first lateral bar 120 is hingedly coupled. The distal end 125 of the second lateral bar 124 is hingedly coupled to a second bar coupling joint 129 so that the first lateral bar 120, the second lateral bar 124 and the upright bar 128 are all constrained to movement along the predetermined plane. A passive device 134 (such as a linear spring) couples the first platform coupling joint 110 to the second bar coupling joint 129. A cable 134 (for example, a steel cable, a plastic cable, a rope, a wire, a cord, a line, or a strap, depending upon the specific application) is affixed to the first bar coupling joint 129 and engages the second platform coupling joint 111. The upright bar 128 moves downwardly when tension is applied to the cable 134 and moves upwardly when tension is released from the cable 134.

As shown in FIG. 1A, in this embodiment, when the tension is released from the cable 134, the passive device 130 pulls the second bar coupling joint 129, thereby causing the upright bar 128 to move upwardly. As shown in FIG. 1B, retracting the cable 134 causes the upright bar 128 to move downwardly and, as shown in FIG. 1C, fully retracting the cable 134 fully extends the leg mechanism 100.

Figure 2A:
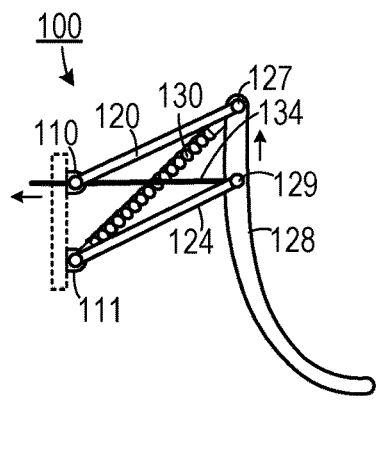
FIG. 2A is a schematic diagram of a second embodiment of a leg system in which the leg is retracted.
Figure 2B:
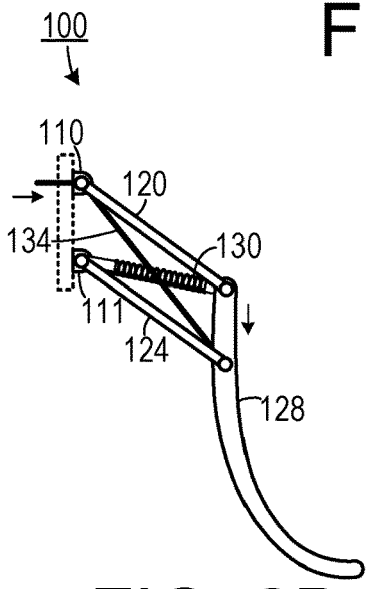
FIG. 2B is a schematic diagram of the second embodiment of a leg system in which the leg is extended.

As shown in FIG. 2A, the passive device 130 can couple the first bar coupling joint 127 to the second platform coupling joint 111 and the cable 134 can be affixed to the second bar coupling joint 129. In this embodiment, applying tension to the cable 134 causes the leg mechanism 100 to retract and releasing tension from the cable 134 causes the leg mechanism 100 to extend.

Figure 3A:
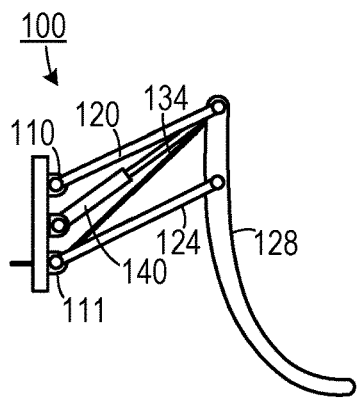
FIG. 3A is a schematic diagram of a third embodiment of a leg system.

In the embodiments disclosed above the passive device 130 pulls inwardly. In other embodiments, a passive device can exert an outward force. For example, in one embodiment, as shown in FIG. 3A, the passive device 140 can include a gas spring, which exerts an expansive force.

Figure 3B:
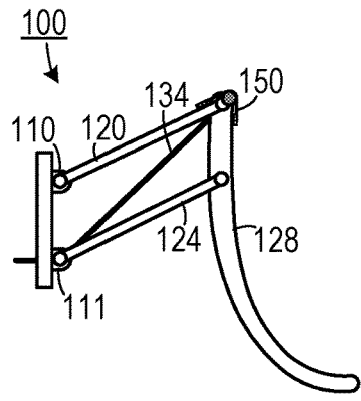
FIG. 3B is a schematic diagram of a fourth embodiment of a leg system.

Other types of passive devices may also be used. For example, as shown in FIG. 3B, the passive device can include a torsional spring 150 coupled to the first lateral bar 120 and the upright bar 128. Two individual articulated leg systems of the type shown could be used in robotics in which each leg system 100 can be controlled independently.

Figures 4A, 4B:
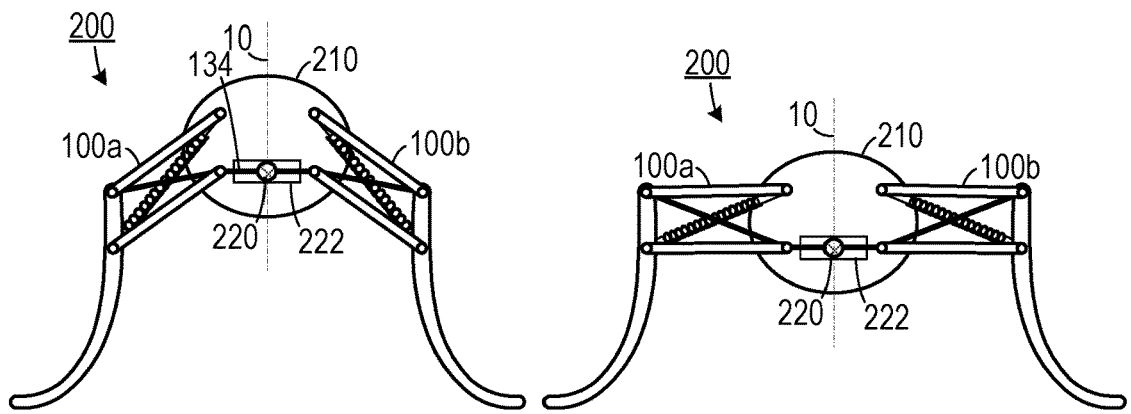
FIG. 4A is a schematic diagram of a two leg system in which the legs are extended.
FIG. 4B is a schematic diagram of a two leg system in which the legs are retracted.
Figure 4C:
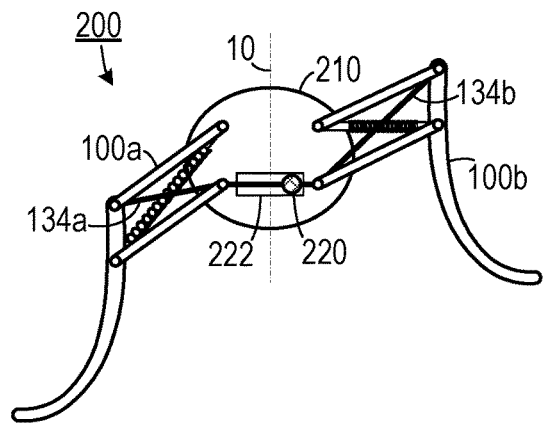
FIG. 4C is a schematic diagram of a two leg system showing differential extension and retraction of the legs.

As shown in FIGS. 4A-4B, a two leg system 200 can employ two articulated leg systems 100a and 100b of the type disclosed above that are affixed to a frame on a platform 210 and both articulated leg systems 100a and 100b can employ cables 134a and 134b that are wound onto a common spool 220. Winding the cables 134a and 134b onto the spool 220 causes both of the legs to move in a first direction (which is downwardly in the embodiment shown) by the same amount. Un-winding the cables 134a and 134b from the spool 220 causes both of the legs to move in the opposite direction (which is upwardly in the embodiment shown). The spool 220 can be mounted on a track 222 and moved laterally with respect to a centerline 10. As shown in FIG. 4C, lateral movement of the spool 220 causes the articulated leg systems 100a and 100b to move differentially, which makes this embodiment particularly well suited for use on an uneven surface. Also, the force is distributed evenly across both of the articulated leg systems 100a and 100b and the force experienced by the spool 220 is only the difference between the force on imposed on it by the cables 134a and 134b.

Figure 5:
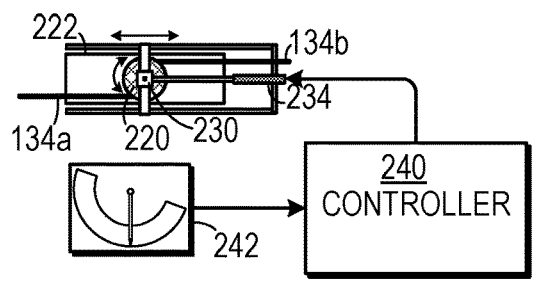
FIG. 5 is a schematic diagram of a spool, sensor and controller.

As shown in FIG. 5, the spool 220 can be rotated by a motor 230 attached thereto. A differential motion actuator 234 (such as a screw drive of a hydraulic actuator) can drive the spool 220 laterally along the track 222. A sensor 242, which could be either a roll indicator or a contact (pressure) sensor, can provide information about the orientation of the platform 210 or the pressure sensed by each leg system 100. A controller 240 receives information from the sensor 242 and controls the motor 230 (including the amount and direction of rotation) and the actuator 234 based on the information.

Figure 6:
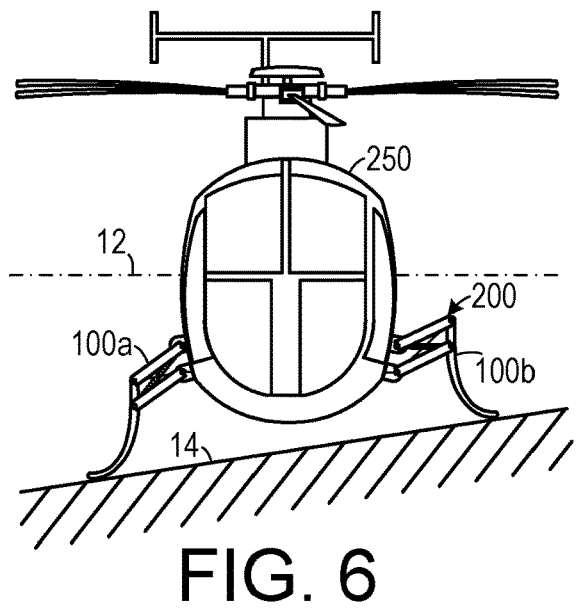
FIG. 6 is a schematic diagram of a two leg system employed as landing gear for a helicopter.

As shown in FIG. 6, a two leg system 200 can be used as the landing gear for a helicopter 250. With such a system the helicopter 250 can land on a sloped or uneven surface 14, but remain level in relation to a horizontal 12 reference.

In one embodiment of a cable-driven four-bar linkage mechanism for actuating legs, there are two symmetric followers attached to the body of interest and a coupler which extend to form the leg. The mechanism by itself is a one degree of freedom system. Motion in one direction is driven by a passive spring-like element, for example upward motion can be achieved through a compression spring pulling along one diagonal. The reverse motion is achieved through a cable along the opposite direction of the passive element. In the example described above, downward motion of the leg is achieved by retracting the cable (i.e. pulling) and hence extending the spring, and upward motion is achieved by releasing the cable and hence allowing the spring to pull the leg up.

Two such cable-driven mechanisms can be linked with one continuous cable to achieve unique actuation properties. In such a configuration, two pairs of legs are attached to the body of interest and a single cable spans from the diagonal of one leg, through the body, onto the diagonal of the other leg. In such a design one can use an actuator (such as a motor) that reduces/increases the overall length of the cable (for example a spool) to achieve symmetric downward/upward motion of the two legs, and a second actuator that changes the center of the cable without changing its length (for example by moving the spool without rotating it) to achieve an asymmetric movement where one leg moves down and one leg moves up. This is in distinct contrast to traditional actuation strategies where a single actuator is used for each one degree of freedom leg.

This embodiment has certain advantages in terms of the loads seen by the actuators. The contact loads coming through the legs are distributed as tensile loads on the cable. In this embodiment, where the two legs couple through a continuous cable, the actuator only sees the difference in loads coming from the two legs. For example, if the cable for each leg is under 100 lbs. of tension, the torsional actuator for the spool would require no torque to maintain that position. In contrast, in a traditional design, each actuator controlling the legs independently would be required to hold a 100 lb. load. This embodiment also has the advantage over systems in which the actuator has to be placed in each leg in that all actuation can be placed within the body to which the legs are affixed—not in the legs, hence reducing the weight of the legs.

Figure 7A:
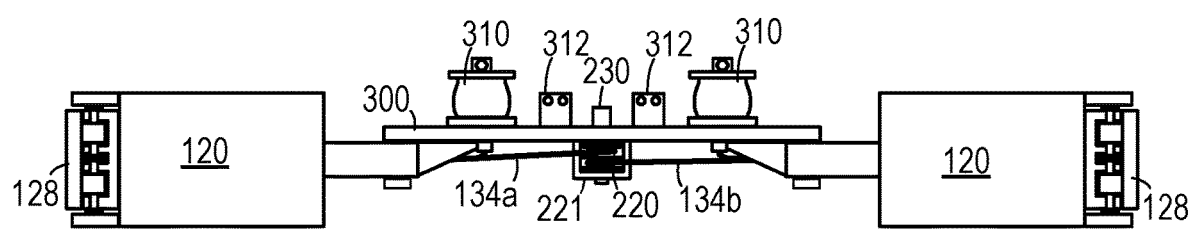
FIG. 7A is a top plan view of one embodiment of a two leg system.
Figure 7B:
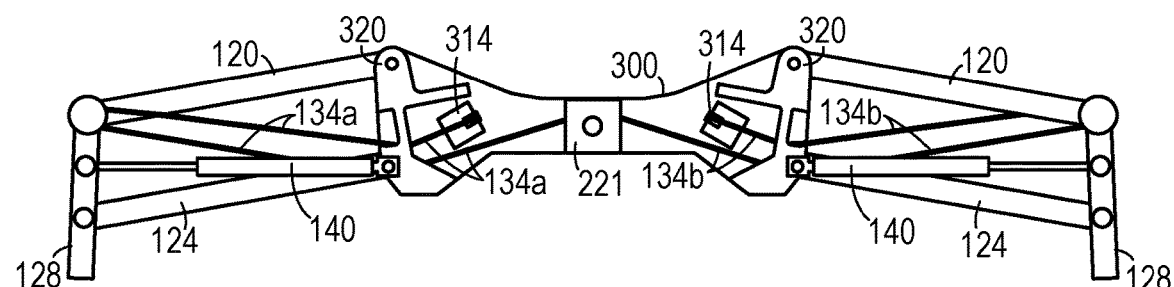
FIG. 7B is a side elevational view of one embodiment of a two leg system.

An experimental embodiment is shown in FIGS. 7A and 7B, in which the elements described above are mounted on a frame 300. This embodiment employs a protective box 221 around the spool. It also includes two dampers 310 (such a rubber dampers), each of which is affixed to a different end of the cable 134a and 134b, to absorb shock transmitted from the vertical legs 128. In this embodiment, the spool end of each cable 134a and 134b is attached to the same side of the spool 220 to that as the spool 220 is rotated clockwise, then cable 134a is wound onto the spool 220 and cable 134b is wound off of the spool 220. Similarly, as the spool 220 is rotated counter-clockwise, then cable 134b is wound onto the spool 220 and cable 134a is wound off of the spool 220. Thus, differential movement of the legs 120 is effected by rotation of the spool 220: if the spool 220 rotates in one direction then the left leg will go up and the right leg will go down by the same amount, if it is rotated in the opposite direction then the left leg will go down and the right leg will go up by the same amount.

Ground contact forces experienced by the body of interest are transferred from one leg to the other through the cable connecting them. This has some advantages. For example, the actuators see reduced loads as the differential motion actuator only needs to hold the difference of the loads seen by the two cables.

The differential actuator system offers the advantage that if the actuator fails, the legs will stay in their current position. In devices in which each leg is actuated independently, a leg will collapse if its actuator fails.

Although specific advantages have been enumerated above, various embodiments may include some, none, or all of the enumerated advantages. Other technical advantages may become readily apparent to one of ordinary skill in the art after review of the following figures and description. It is understood that, although exemplary embodiments are illustrated in the figures and described below, the principles of the present disclosure may be implemented using any number of techniques, whether currently known or not. Modifications, additions, or omissions may be made to the systems, apparatuses, and methods described herein without departing from the scope of the invention. The components of the systems and apparatuses may be integrated or separated. The operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. It is intended that the claims and claim elements recited below do not invoke 35 U.S.C. 112(f) unless the words "means for" or "step for" are explicitly used in the particular claim. The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A leg mechanism, comprising:
(a) an articulated leg system having a leg portion;
(b) a passive device coupled to the articulated leg system that applies a first force to a portion thereof; and
(c) a cable coupled to the articulated leg system that selectively applies a second force, in opposition to the first force, to a portion thereof,
wherein when the cable is drawn away from the articulated leg system, the second force moves the leg portion in a first direction and wherein when tension is released from the cable, the passive device exerts the first force so as to move the leg portion a second direction that is opposite the first direction.

2. The leg mechanism of claim 1, wherein the passive device comprises a linear spring.

3. The leg mechanism of claim 1, wherein the passive device comprises a spring selected from a list of springs consisting of: a coil spring, a gas spring and a torsion spring.

4. The leg mechanism of claim 1, wherein the cable is selected from a list of cable types consisting of: a steel cable, a rope, a wire, a cord, a line, and a strap.

5. A leg mechanism, comprising:
an articulated leg system having a leg portion, including:
a first platform coupling joint and a second platform coupling joint spaced apart from and disposed below the first platform coupling joint at a first distance;
a first lateral bar having a proximal end and an opposite distal end, the proximal end rotationally coupled to the first platform coupling joint so that the first lateral bar is rotatable about the first platform coupling joint and is constrained to movement along a predetermined plane;
a second lateral bar, disposed below the first lateral bar, having a proximal end and an opposite distal end, the proximal end rotationally coupled to the second platform coupling joint so that the second lateral bar is rotatable about the second platform coupling joint and is constrained to movement along the predetermined plane; and
an upright bar including a first bar coupling joint and a second bar coupling joint spaced apart from the first bar coupling joint at the first distance, the distal end of the first lateral bar hingedly coupled to the first bar coupling joint and the distal end of the second lateral bar hingedly coupled to the second bar coupling joint so that the first lateral bar, the second lateral bar and the upright bar are constrained to movement along the predetermined plane;
a passive device coupled to the articulated leg system that applies a first force to a portion thereof; and
a cable coupled to the articulated leg system that selectively applies a second force, in opposition to the first force, to a portion thereof wherein the passive device applies the first force to the upright bar,
wherein when the cable is drawn away from the articulated leg system, the second force moves the leg portion in a first direction and wherein when tension is released from the cable, the passive device exerts the first force so as to move the leg portion a second direction that is opposite the first direction, and
wherein the cable is affixed adjacent to a selected one of the first bar coupling joint and the second bar coupling joint and engaging the second platform coupling joint when affixed adjacent to the first bar coupling joint or engaging the first platform coupling joint when affixed adjacent to the second bar coupling joint.

6. The leg mechanism of claim 5, wherein when the cable is affixed adjacent to the first bar coupling joint and engages the second platform coupling joint, the upright bar moves downwardly when tension is applied to the cable and moves upwardly when tension is released from the cable, and wherein when the cable is affixed adjacent to the second bar coupling joint and engages the first platform coupling joint, the upright bar moves upwardly when tension is applied to the cable and moves downwardly when tension is released from the cable.

7. The leg mechanism of claim 5, wherein the passive device comprises a linear spring.

8. The leg mechanism of claim 5, wherein the passive device comprises a spring selected from a list of springs consisting of: a coil spring, a gas spring and a torsion spring.

9. The leg mechanism of claim 5, wherein the cable is selected from a list of cable types consisting of: a steel cable, a rope, a wire, a cord, a line, and a strap.

10. The leg mechanism of claim 5, wherein the first platform coupling joint and the second platform coupling joint are affixed to a frame.

11. The leg mechanism of claim 10, further comprising a shock absorber affixed to the platform and affixed to an end of the cable and configured to absorb shock from the cable.

12. A leg mechanism, comprising:
  (a) an articulated leg system having a leg portion;
  (b) a passive device including a linear spring coupled to the articulated leg system that applies a first force to a portion thereof; and
  (c) a cable coupled to the articulated leg system that selectively applies a second force, in opposition to the first force, to a portion thereof,
    wherein when the cable is drawn away from the articulated leg system, the second force moves the leg portion in a first direction and wherein when tension is released from the cable, the passive device exerts the first force so as to move the leg portion a second direction that is opposite the first direction.

13. The leg mechanism of claim 12, wherein the passive device comprises a spring selected from a list of springs consisting of: a coil spring, a gas spring and a torsion spring.

14. The leg mechanism of claim 12, wherein the cable is selected from a list of cable types consisting of: a steel cable, a rope, a wire, a cord, a line, and a strap.

15. The leg mechanism of claim 12, wherein the articulated leg system comprises:
  (a) a first platform coupling joint and a second platform coupling joint spaced apart from and disposed below the first platform coupling joint at a first distance;
  (b) a first lateral bar having a proximal end and an opposite distal end, the proximal end rotationally coupled to the first platform coupling joint so that the first lateral bar is rotatable about the first platform coupling joint and is constrained to movement along a predetermined plane;
  (c) a second lateral bar, disposed below the first lateral bar, having a proximal end and an opposite distal end, the proximal end rotationally coupled to the second platform coupling joint so that the second lateral bar is rotatable about the second platform coupling joint and is constrained to movement along the predetermined plane; and
  (d) an upright bar including a first bar coupling joint and a second bar coupling joint spaced apart from the first bar coupling joint at the first distance, the distal end of the first lateral bar hingedly coupled to the first bar coupling joint and the distal end of the second lateral bar hingedly coupled to the second bar coupling joint so that the first lateral bar, the second lateral bar and the upright bar are constrained to movement along the predetermined plane;
    wherein the passive device applies the first force to the upright bar; and
    wherein the cable is affixed adjacent to a selected one of the first bar coupling joint and the second bar coupling joint and engaging the second platform coupling joint when affixed adjacent to the first bar coupling joint or engaging the first platform coupling joint when affixed adjacent to the second bar coupling joint.

16. The leg mechanism of claim 15, wherein when the cable is affixed adjacent to the first bar coupling joint and engages the second platform coupling joint, the upright bar moves downwardly when tension is applied to the cable and moves upwardly when tension is released from the cable, and wherein when the cable is affixed adjacent to the second bar coupling joint and engages the first platform coupling joint, the upright bar moves upwardly when tension is applied to the cable and moves downwardly when tension is released from the cable.

17. The leg mechanism of claim 15, wherein the first platform coupling joint and the second platform coupling joint are affixed to a frame.

18. The leg mechanism of claim 17, further comprising a shock absorber affixed to the platform and affixed to an end of the cable and configured to absorb shock from the cable.

\* \* \* \* \*